(12) United States Patent
Tifford

(10) Patent No.: US 8,478,671 B1
(45) Date of Patent: Jul. 2, 2013

(54) METHOD AND SYSTEM FOR COMMUNITY-BASED TAX DEDUCTION ADVICE

(75) Inventor: Alan Tifford, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 407 days.

(21) Appl. No.: 12/209,101

(22) Filed: Sep. 11, 2008

(51) Int. Cl.
*G06Q 40/00* (2012.01)

(52) U.S. Cl.
USPC .......................................................... 705/35

(58) Field of Classification Search
USPC ....................... 705/31, 36; 706/11; 709/246
See application file for complete search history.

(56) References Cited

U.S. PATENT DOCUMENTS

| | | | | |
|---|---|---|---|---|
| 6,473,745 | B2 * | 10/2002 | Doerr et al. | 706/11 |
| 7,693,769 | B1 * | 4/2010 | Burlison et al. | 705/36 T |
| 2008/0071929 | A1 * | 3/2008 | Motte et al. | 709/246 |
| 2008/0189197 | A1 * | 8/2008 | Allanson et al. | 705/31 |
| 2010/0312724 | A1 * | 12/2010 | Pinckney et al. | 706/11 |

* cited by examiner

*Primary Examiner* — Samica L Norman
(74) *Attorney, Agent, or Firm* — Osha Liang LLP

(57) ABSTRACT

A method for community-based tax deduction advice involves displaying a suggestion input control in a networked tax preparation application, obtaining tax deduction suggestions from taxpayers using the suggestion input control, and displaying a live feed of tax deduction suggestions to a user of the networked tax preparation application.

16 Claims, 5 Drawing Sheets

METHOD AND SYSTEM FOR COMMUNITY-BASED TAX DEDUCTION ADVICE

BACKGROUND

When filing a tax return, a taxpayer (i.e., an individual or business) generally has an opportunity to claim one or more tax deductions, also referred to as tax-deductible expenses. A tax deduction represents an expense incurred by the taxpayer, and may be subtracted from the taxpayer's reported gross income, thereby yielding a lower net income. A lower net income typically incurs lower taxes. Therefore, taxpayers are generally interested in identifying and claiming as many tax deductions as possible.

However, filing a tax return is a notoriously complex process, and it may be difficult for the taxpayer to identify all of the tax deductions available. For example, a small business owner may have difficulty identifying all of the business-related expenses that may be claimed as tax deductions. Similarly, an independent contractor may not be aware of the numerous expenses that may be claimed as tax-deductible business expenses. Therefore, each tax year, many individuals and businesses fail to take advantage of the full extent of tax deductions available to them.

SUMMARY

In general, in one aspect, the invention relates to a method for community-based tax deduction advice. The method involves displaying a suggestion input control in a networked tax preparation application, obtaining a plurality of tax deduction suggestions from a plurality of taxpayers using the suggestion input control, and displaying a live feed of the plurality of tax deduction suggestions to a user of the networked tax preparation application.

In general, in one aspect, the invention relates to a system for community-based tax deduction advice. The system includes a networked tax preparation application configured to display a suggestion input control to a plurality of taxpayers, and obtain a plurality of tax deduction suggestions from the plurality of taxpayers using the suggestion input control. The system further includes a feed generator configured to generate a live feed of the plurality of tax deduction suggestions, wherein the networked tax preparation application is further configured to display the live feed to a user of the networked tax preparation application.

In general, in one aspect, the invention relates to a graphical user interface presenting community-based tax deduction advice in a networked tax preparation application. The graphical user interface includes a suggestion input control configured to obtain a plurality of tax deduction suggestions from a plurality of taxpayers, and a live feed configured to display the plurality of tax deduction suggestions to a user of the networked tax preparation application.

In general, in one aspect, the invention relates to a computer-readable medium comprising executable instructions for community-based tax deduction advice. The executable instructions comprise instructions to display a suggestion input control in a networked tax preparation application, obtain a plurality of tax deduction suggestions from a plurality of taxpayers using the suggestion input control, and display a live feed of the plurality of tax deduction suggestions to a user of the networked tax preparation application.

Other aspects of the invention will be apparent from the following description and the appended claims.

DETAILED DESCRIPTION

Figure 1:
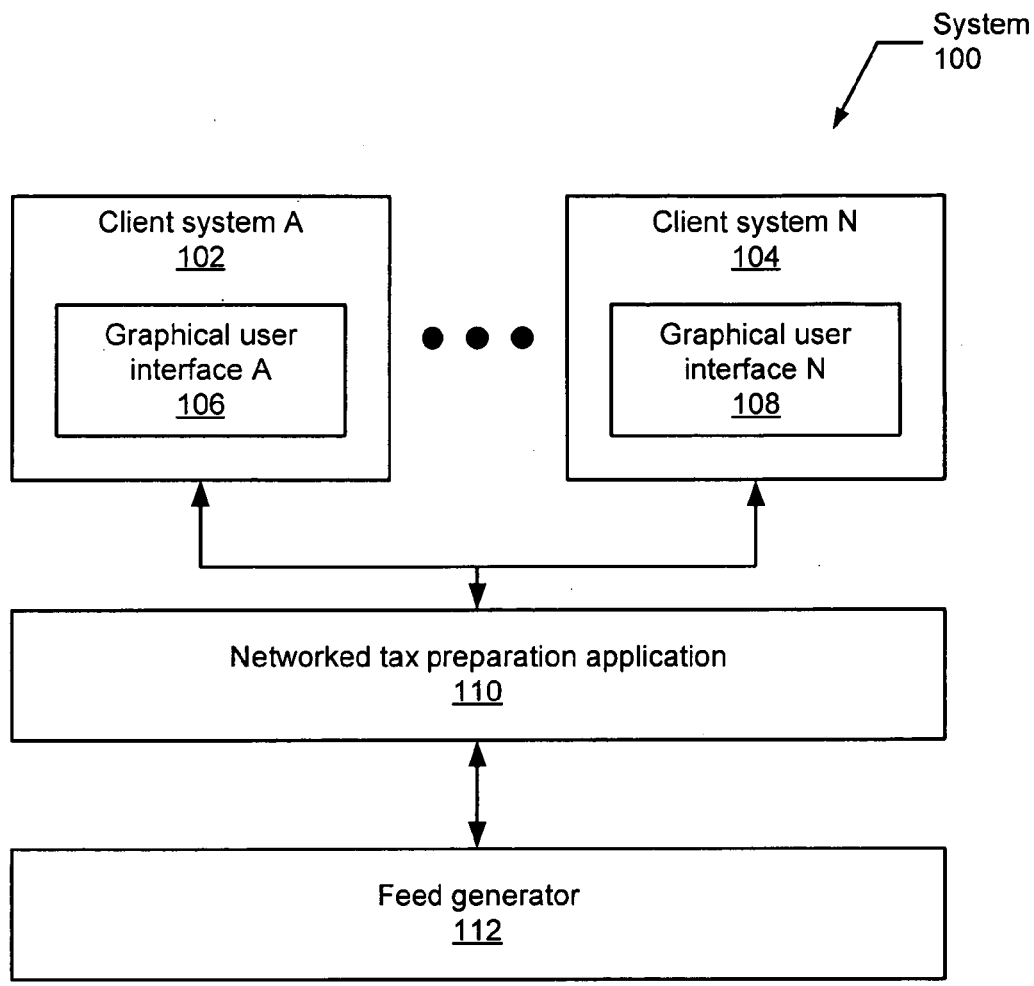
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for community-based tax deduction advice. A networked tax preparation application is made available to multiple taxpayers. These taxpayers constitute the aforementioned "community" of taxpayers. The networked tax preparation application includes a suggestion input control, which taxpayers may use to provide tax deduction suggestions. These tax deduction suggestions are then used to generate a live feed that is provided to users of the networked tax preparation application. In this manner, the community of taxpayers is able to advise each other about available tax deductions.

For the purposes of this discussion, a "tax deduction suggestion" refers to any type of user-provided input indicating a tax deduction that may also be available to other users of the networked tax preparation application. In one or more embodiments of the invention, users are encouraged to provide tax deduction suggestions for tax deductions that they are actually claiming. For example, a user who is claiming "rental car" as a tax deduction may also input "rental car" as a tax deduction suggestion for other users. Users may also provide tax deduction suggestions for tax deductions that they are not actually claiming. For example, a user who is aware of a potential tax deduction, but does not qualify for that tax deduction, may nonetheless be able to input a corresponding tax deduction suggestion.

FIG. 1 shows a diagram of a system (100) in accordance with one or more embodiments of the invention. The system includes a networked tax preparation application (110) configured to provide tax preparation services to multiple client systems (e.g., client system A (102), client system N (104)). Further, in one or more embodiments of the invention, each of the client systems includes a graphical user interface (e.g., graphical user interface A (106), graphical user interface N (108)) that provides access to features of the networked tax preparation application (110).

In general, the networked tax preparation application (110) and the clients may be arranged in any type of client/server architecture that allows users of the client systems to access network-enabled tax preparation features. For example, in one or more embodiments of the invention, the networked tax preparation application (110) is a web-based application and the graphical user interfaces are web pages displayed in web browsers. Alternatively, in one or more embodiments, the networked tax preparation application (110) includes a distributable software component installed on each of the client systems, and the graphical user interfaces are screens of the distributable software component. For example, distributable tax preparation software may be installed on each of the clients, the graphical user interfaces may be screens of the distributable tax preparation software, and the distributable tax preparation software may include one or more features configured to operate in communication with a network server. Such features may include, for example, online help, electronic filing, or any other type of network-enabled tax preparation feature.

Further, in one or more embodiments of the invention, the system (100) includes a feed generator (112). In one or more embodiments of the invention, the feed generator (112) is a server-side component of the networked tax preparation application (110). Alternatively, the feed generator (112) may be a third-party component (i.e., provided by a different entity than the client systems and the networked tax preparation application (110)) and communicatively coupled with the networked tax preparation application (110).

In one or more embodiments of the invention, the graphical user interfaces (102, 104) include suggestion input controls for users to provide tax deduction suggestions. Further, in one or more embodiments, the feed generator (112) is configured to generate a live feed using the provided tax deduction suggestions. Suggestion input controls and live feeds in accordance with one or more embodiments of the invention are discussed in detail below. In one or more embodiments of the invention, the networked tax preparation application (110) is configured to transmit the live feed generated by the feed generator (112) to the graphical user interfaces, thereby providing tax deduction suggestions to users of the client systems.

In one or more embodiments of the invention, the feed (live or canned) is repurposed on other websites or on a micro-website of the company (or other entity) responsible for providing content, advice, suggestions, etc. A micro-website may promote the various visualization options as well as the feature itself. For example, a user shopping at company website (e.g., officeproductsinc.com) may see a filtered feed/advertisement relevant to office supply deductions. The feed is used both to promote the feature and tax preparation services.

Figure 2:
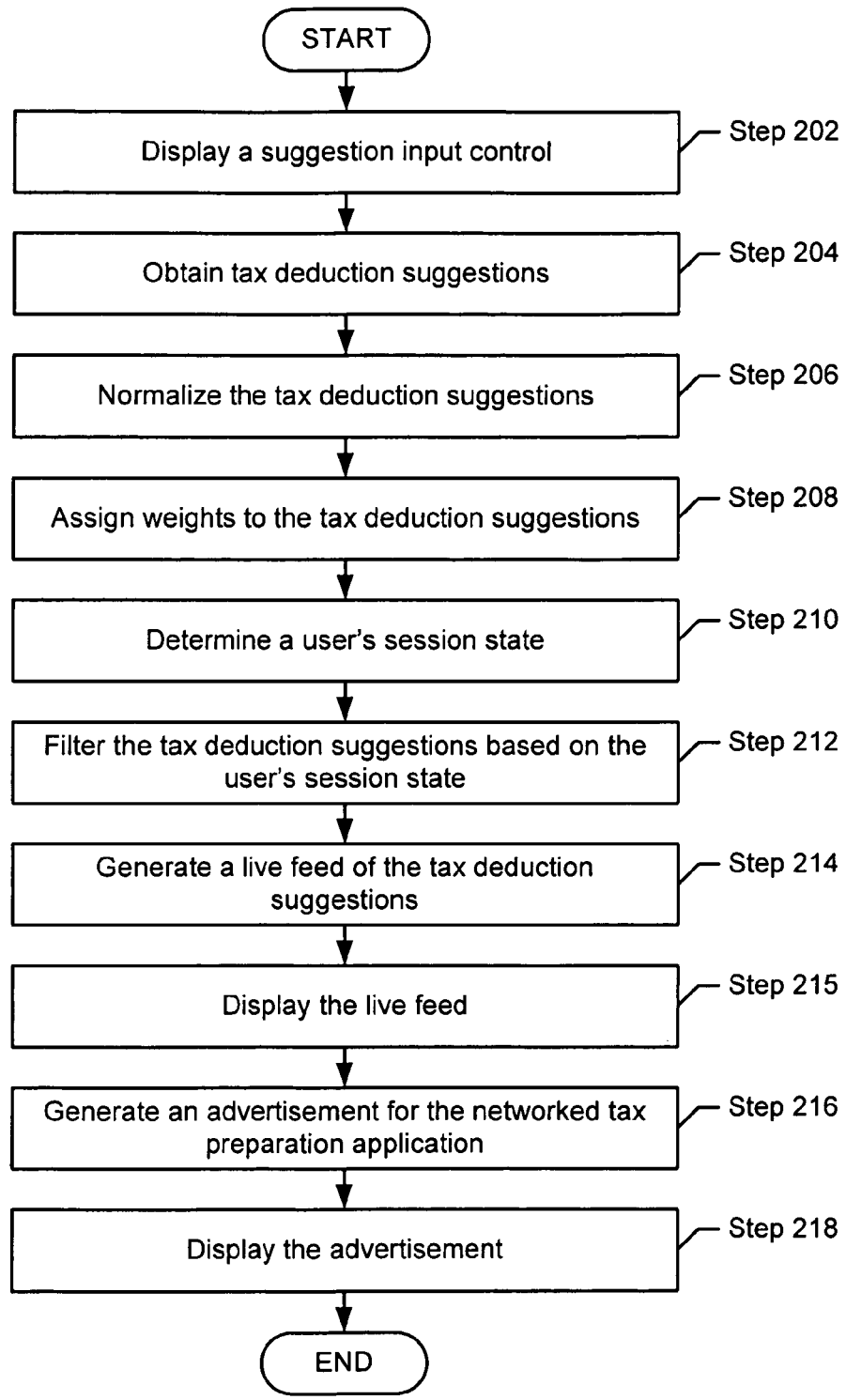
FIG. 2 shows a flowchart of a method for community-based tax deduction advice in accordance with one or more embodiments of the invention.

FIG. 2 shows a flowchart of a method for community-based tax deduction advice in accordance with one or more embodiments of the invention. In one or more embodiments of the invention, one or more of the steps shown in FIG. 2 may be omitted, repeated, and/or performed in a different order than the order shown in FIG. 2. Accordingly, embodiments of the invention should not be considered limited to the specific arrangement of steps shown in FIG. 2.

In one or more embodiments of the invention, in Step 202, a suggestion input control is displayed in a client-side graphical user interface. Specifically, the graphical user interface is a client-side interactive interface of a networked tax preparation application, such as a web page or a screen generated by a distributable software component of the networked tax preparation application. In one or more embodiments of the invention, the suggestion input control is displayed in multiple graphical user interfaces displayed in multiple client systems (i.e., systems used by multiple different users of the networked tax preparation application).

The suggestion input control may take any form that allows a user to input tax deduction suggestions. For example, the suggestion input control may be a single-line text field, a multi-line text box, or any other type of textual input control. Further, the suggestion input control may be configured to accept audio input and convert the audio input to textual form. Further, actual reported tax data may be used as input. For example, after tax preparation is completed for the deduction section, the actual tax deduction data may be anonymously supplied to the feed generator. Those skilled in the art will appreciate that textual data may be obtained in many different ways.

In one or more embodiments of the invention, in Step 204, tax deduction suggestions are obtained using the suggestion input control. Specifically, tax deduction suggestions are obtained from multiple users of the networked tax preparation application. In one or more embodiments of the invention, obtaining the tax deduction suggestion involves receiving input from the users and transmitting the input over a network to a server-side component of the networked tax preparation application.

In one or more embodiments of the invention, in Step 206, the tax deduction suggestions are normalized. Normalizing the tax deduction suggestions involves processing the tax deduction suggestions to help reduce naming inconsistencies. For example, different users may input "airplane ticket," "plane ticket" and "airfare," all of which have the same meaning. In this example, to normalize the tax deduction suggestions, one of the terms (e.g., "plane ticket") is selected as the preferred nomenclature, and variations with the same meaning (e.g., "airplane ticket" and "airfare") are avoided and/or converted to the preferred nomenclature. Many different types of tax deduction suggestions may be normalized.

Further, the normalization may be performed in many different ways. In one or more embodiments of the invention, the normalization is performed using an auto-complete feature associated with the suggestion input control. Specifically, in one or more embodiments of the invention, as a user inputs a tax deduction suggestion, the auto-complete feature automatically provides associated terms, for example in a drop-down box. The provided terms may include more complete versions of the user's input (for example, providing the term "plane ticket" when the user has only entered the initial characters "pla") and/or alternative terms (for example, providing the term "plane ticket" when the user has entered the term "airfare").

In one or more embodiments of the invention, the specific terms provided in the auto-complete feature are based on frequencies of tax deduction suggestions that have already been provided. For example, if more users have suggested the term "airfare" than "plane ticket," then the auto-complete feature may default to using the term "airfare" instead. In such cases, the terms provided by the auto-complete feature may change over time.

Alternatively, normalization of tax deduction suggestions may occur server-side, based on an analysis of tax deduction suggestions that have already been obtained. For example, in a group of tax deduction suggestions, the term "airfare" may be replaced with the term "plane ticket" wherever the term "airfare" occurs. Such replacements may be performed, for example, using regular expressions. Normalization of tax deduction suggestions may be performed in many different ways.

In one or more embodiments of the invention, in Step 208, weights are assigned to the tax deduction suggestions. Specifically, in one or more embodiments of the invention, the weights are ordered values—that is, letters, numbers, and/or other symbolic values having a known sequence—that indicate the relative importance of the tax deduction suggestions.

In one or more embodiments of the invention, the weights are based on how frequently each tax deduction suggestion is obtained from users of the networked tax preparation application. Specifically, more frequently obtained tax deduction suggestions may be assigned 'higher' weights and less frequently obtained tax deduction suggestions may be assigned 'lower' weights.

In one or more embodiments of the invention, the frequency of a tax deduction suggestion refers simply to a count of the number of times the corresponding tax deduction suggestion is obtained. Table 1 shows an example of frequency-based weights in accordance with one or more embodiments of the invention. The specific terms and frequencies shown in Table 1 are provided for exemplary purposes only and should not be construed as limiting the scope of the invention.

TABLE 1

Frequency-based weights of tax deduction suggestions

| TERM | FREQUENCY/COUNT |
| --- | --- |
| Gasoline | 6,291 |
| Home office rent | 589 |
| Plane ticket | 26,718 |
| Last year's taxes | 1,902 |
| Computer | 221 |
| Office supplies | 1,064 |
| Rental car | 8,557 |

In one or more embodiments of the invention, the frequency of a tax deduction suggestion is determined relative to a particular time period. In other words, the count of each tax deduction suggestion may be measured only for a predetermined time period prior to the time the count is made. For example, the count may apply only to the most recent hour, day, week, month, or any other appropriate time period. In one or more embodiments of the invention, limiting the count to a particular time period helps ensure that the weights reflect the most recent (and accordingly, the most relevant) trends in tax deduction suggestions.

Alternatively, the weights assigned to tax deduction suggestions may take different forms. In one or more embodiments of the invention, different weights are assigned to ranges of counts. For example, tax deduction suggestions that are obtained between one thousand and five thousand times may all be assigned one weight, and tax deduction suggestions that are obtained between five thousand and ten thousand times may be assigned another weight. Further, letters and/or other symbolic values may be used instead of numerical values. In view of this discussion, those skilled in the art will appreciate that tax deduction suggestions may be weighted in many different ways.

In one or more embodiments of the invention, in Step 210, a user's session state is determined. For the purposes of this discussion, a "session state" may refer to any user-specific information associated with an active or inactive session of the networked tax preparation application. For example, a user's session state may include information about the screen currently displayed in the user's graphical user interface (i.e., the current webpage or screen of a distributable software component). As another example, the user's session state may include information about input that the user has already provided to the networked tax preparation application. In one or more embodiments of the invention, the input includes information that may be used to help determine the user's tax status, such as age, location, employment information, marital status, dependents, previous year tax information, and/or any other type of tax-related information.

In one or more embodiments of the invention, in Step 212, the tax deduction suggestions are filtered based on the user's session state. In one or more embodiments of the invention, filtering the tax deduction suggestions involves hiding or removing tax deduction suggestions that are not relevant to the user's session state. In other words, the tax deduction suggestions are filtered to emphasize the tax deduction suggestions that are relevant to the user's session state.

For example, if the user is currently viewing a screen that relates to self-employment taxes, the tax deduction suggestions may be filtered to emphasize tax deduction suggestions that relate to self-employment (e.g., office expenses, travel expenses, or any other type of tax deduction suggestion that may be relevant to a self-employed taxpayer). If the user switches to viewing a screen that relates to charitable contributions, the tax deduction suggestions may be filtered to emphasize tax deduction suggestions that relate to charitable contributions (e.g., types of contributions that are tax-deductible). Those skilled in the art will appreciate that the networked tax preparation application may have many different screens, and the tax deduction suggestions may be filtered in many different ways based on those screens.

As another example, the tax deduction suggestions may be filtered based on the user's indicated and/or anticipated tax status, as determined using input already provided by the user. For example, if the user is married and filing jointly, the tax deduction suggestions may be filtered to remove tax deduction suggestions that apply only to single taxpayers. Those skilled in the art will appreciate that many different types of indicated and/or anticipated tax statuses exist, and the tax deduction suggestions may be filtered in many different ways based on those tax statuses.

As another example, the tax deduction suggestions may be filtered based on data relating to "people like you." Using actual tax data of the user (as described above) with demographics data points supplied by the user and/or taxpayer, additional targeted suggestion are available by comparing the user's demographics to those with similar demographics. Behavioral data related to the user (as well as many other types of data) may also be used to determine relationships between deductions (e.g., others who took XYZ tax deduction also took ABC tax deduction). The justification for the relationships formed from the data may be derived using techniques known to those skilled in the art and may or may not be exposed to the user.

In one or more embodiments of the invention, in Step 214, a live feed of the tax deduction suggestions is generated. In one or more embodiments of the invention, generating the live feed involves combining the tax deduction suggestions from multiple users and generating a graphical user interface component using the combined tax deduction suggestions. For example, the live feed may be generated using hypertext markup language (HTML), extensible markup language (XML), Adobe® Flash®, JavaScript™, a dynamically generated executable file, any other type of electronic data format, or any combination thereof. Adobe® and Flash® are trademarks of Adobe Systems, Inc. JavaScript™ is a trademark of Sun Microsystems, Inc.

For the purposes of this discussion, the live feed is referred to as "live" because the live feed is regularly updated using the more recent tax deduction suggestions obtained from users.

In one or more embodiments of the invention, the updating occurs in "real time." That is, as tax deduction suggestions are obtained from users, the tax deduction suggestions are processed and used to refresh the live feed relatively quickly—that is, on the order of seconds or milliseconds. Alternatively, the updating may occur on a periodic schedule, such as once a minute, once an hour, once a day, or any other periodic schedule that allows the live feed to be refreshed with up-to-date tax deduction suggestions.

Further, the live feed may take many different forms. In one or more embodiments of the invention, the live feed is a scrolling list of tax deduction suggestions. Alternatively, the live feed may be a word cloud of tax deduction suggestions. As another alternative, the live feed may include audio representations of the tax deduction suggestions, for example using text-to-speech conversion on the obtained tax deduction suggestions. As still another alternative, the live feed may take the form of a map, where tax deduction suggestions are associated with the regions where they originated. Many different forms of live feeds may be used to represent tax deduction suggestions in a graphical and/or audio form.

As noted above, in one or more embodiments of the invention, the feed (live or canned) is repurposed on other websites or on a micro-website of the company (or other entity) responsible for providing content, advice, suggestions, etc. A micro-website may promote the various visualization options as well as the feature itself. For example, a user shopping at company website (e.g., officeproductsinc.com) may see a filtered feed/advertisement relevant to office supply deductions.

As further noted above, the tax deduction suggestions may have been assigned weights (i.e., in Step 208). In one or more embodiments of the invention, the weights are used to vary the appearances of tax deduction suggestions when the live feed is displayed (i.e., in Step 215) as discussed below. Accordingly, in one or more embodiments of the invention, generating the live feed involves indicating how each tax deduction suggestion should be displayed. The varying appearances of tax deduction suggestions may be accomplished by embedding the weights themselves in the live feed, by assigning different font attributes to different tax deduction suggestions, or by any other method that indicates how the appearances of tax deduction suggestions should be varied. Further, as noted above, the tax deduction suggestions may have been filtered based on a user's session state (i.e., in Step 212). Accordingly, in one or more embodiments of the invention, the live feed is generated using only the subset of the tax deduction suggestions that have "survived" the filtering process.

In one or more embodiments of the invention, in Step 215, the live feed is displayed. Specifically, the live feed generated in Step 214 is displayed in a graphical user interface of the networked tax preparation application (i.e., in a web page, a screen of an executable software component, or any other user-facing graphical interface of the networked tax preparation application). As noted above, the appearances of tax deduction suggestions may be varied based on weights assigned to the tax deduction suggestions. For example, the fonts (e.g., font faces, font sizes, and/or font colors) of tax deduction suggestions may vary when the live feed is displayed. Appearances of tax deduction suggestions may vary in many different ways. Examples of how live feeds may be displayed are discussed below with respect to FIGS. 3 and 4A-4B.

In one or more embodiments of the invention, in Step 216, an advertisement for the networked tax preparation application is generated. In one or more embodiments of the invention, the advertisement includes the live feed, or a variation thereof, as generated in Step 214. Further, in one or more embodiments of the invention, in Step 218, the advertisement generated in Step 216 is displayed. For example, the advertisement may be displayed in a website or in a screen of a different application. In one or more embodiments of the invention, displaying the advertisement involves displaying the live feed, so that potential customers may see what types of tax deductions are possible using the networked tax deduction application.

Figure 3:
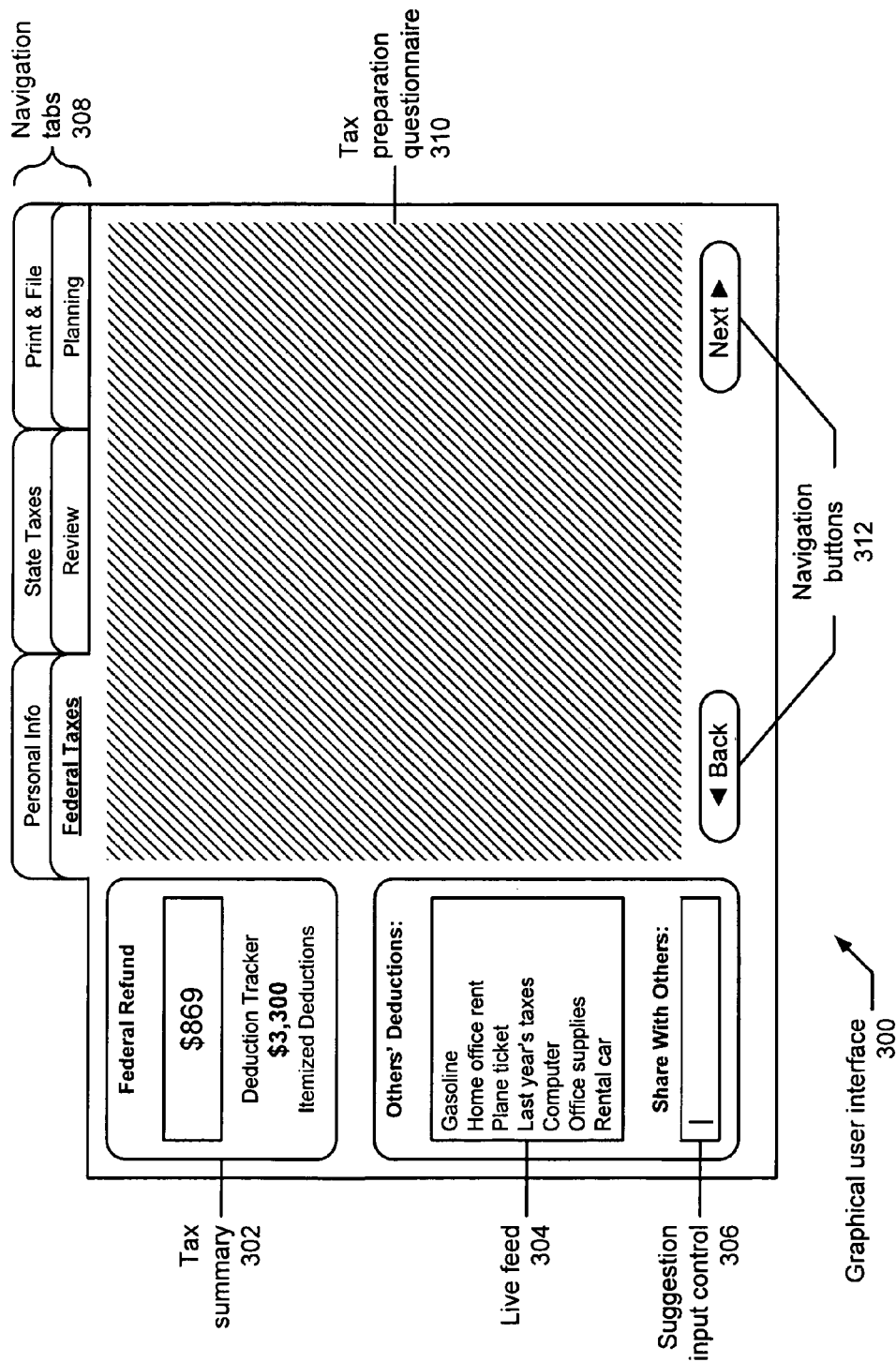
FIG. 3 shows a diagram of a graphical user interface in accordance with one or more embodiments of the invention.

FIG. 3 shows a diagram of a graphical user interface (300) in accordance with one or more embodiments of the invention. Specifically, the graphical user interface (300) shown in FIG. 3 is an example of what an interface of the networked tax preparation application may look like. FIG. 3 is provided for exemplary purposes only, and embodiments of the invention should not be considered limited to the specific graphical elements represented in FIG. 3.

Generally speaking, in one or more embodiments of the invention, the main purpose of the graphical user interface (300) is to facilitate tax preparation using a tax preparation questionnaire (310). Because many different types of questionnaires may be used, the tax preparation questionnaire (310) is merely shown in FIG. 3 as hash marks. However, those skilled in the art will appreciate that the tax preparation questionnaire (310) may include many different types of questions relating to a user's tax filing, such as name, age, occupation, income, address, information about dependents, tax deductions, etc. As the user completes the tax preparation questionnaire (310), information about the user's tax status may be displayed in a tax summary (302).

In one or more embodiments, the graphical user interface (300) includes multiple screens. Accordingly, in one or more embodiments, the graphical user interface (300) includes navigation tabs (308) and/or navigation buttons (312) that allow the user to switch between different screens of the graphical user interface (300). As discussed above, the specific screen selected may provide context for filtering a live feed (e.g., live feed (304) of FIG. 3, discussed below).

In one or more embodiments, the graphical user interface (300) includes a suggestion input control (306). The suggestion input control (306) may be a single-line text field, a multi-line textbox, or any other type of interface that allows the user to enter one or more tax deduction suggestions. Further, in one or more embodiments, the graphical user interface (300) includes a live feed (304) of tax deduction suggestions. The live feed (304) may take many different forms, such as a scrolling list, a word cloud, or any other type of graphical and/or audio element used to represent tax deduction suggestions provided by users of the networked tax preparation application using the suggestion input control (306). In FIG. 3, the live feed (304) is shown as a scrolling list in which all of the tax deduction suggestions have identical appearances.

Further, in one or more embodiments, the graphical user interface (300) includes a feed customization control (not shown). In one or more embodiments of the invention, the feed customization control allows the user to customize the live feed (304). For example, the user may be able to select filters to apply to the live feed (304) (for example, to display only tax deduction suggestions related to particular tax concerns). As another example, the user may be able to customize the way tax deduction suggestions are displayed in the live feed (304) (for example, either a scrolling list or word cloud, or using different fonts). As still another example, the user may be able to switch between viewing the most common, the most recent, and the most relevant (e.g., based on the user's session state) tax deduction suggestions. Those skilled in the art will appreciate that a live feed may be customized in many different ways. The user's customization selections may be used to filter and/or weight the tax deduction suggestions in addition to any back-end filtering and/or weighting that may have already occurred.

Figure 4A:
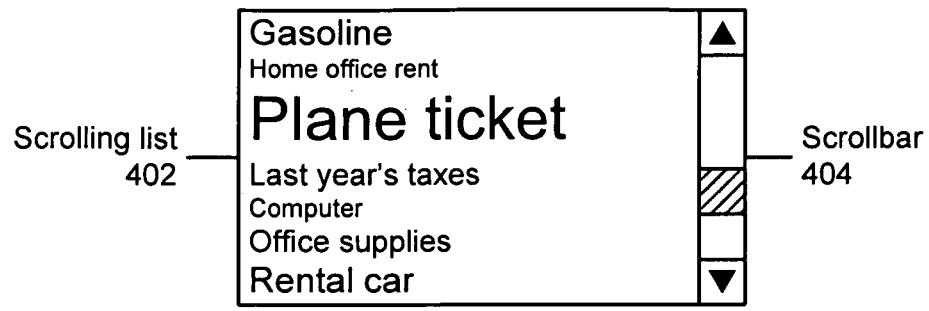
FIGS. 4A-4B show examples of live feeds in accordance with one or more embodiments of the invention.
Figure 4B:
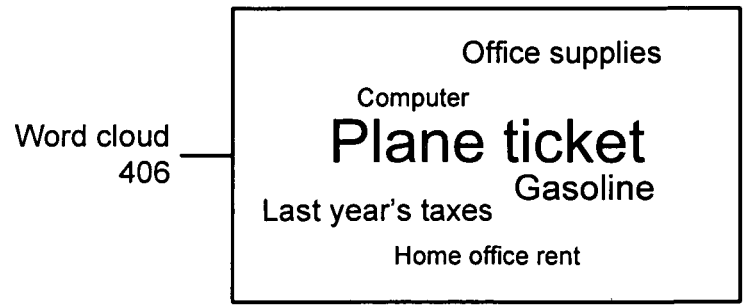

Although the tax deduction suggestions shown in the live feed (304) of FIG. 3 all have identical appearances, as discussed above, the appearances of tax deduction suggestions may vary based on weights assigned to the tax deduction suggestions. FIGS. 4A-4B show examples of live feeds in accordance with one or more embodiments of the invention, in which the appearances of tax deduction suggestions are varied. In FIG. 4A, the live feed is shown as a scrolling list (402) where the tax deduction suggestions have varying font sizes. Further, as shown in FIG. 4A, the scrolling list (402) may include a scrollbar (404) that allows a user to review tax deduction suggestions that have already "scrolled past." FIG. 4B shows the same tax deduction suggestions represented as a word cloud (406).

In general, embodiments of the invention allow for users of a networked tax preparation application to obtain tax deduction advice by sharing tax deduction suggestions with each other. The use of a live feed allows for up-to-date tax deduction suggestions to be provided to users, with little or no administrative intervention required. Because the networked tax preparation application may be used by thousands or millions of taxpayers, the collected contributions of even a fraction of those users may provide a rich set of tax deduction suggestions for the live feed. Further, by weighting and/or filtering the tax deduction suggestions, users may be able to more readily determine which of the tax deduction suggestions are most relevant to their particular tax situations. Thus, in one or more embodiments of the invention, the live feed increases the number of tax deductions of which taxpayers are aware, potentially allowing them to reduce their overall tax burden.

Figure 5:
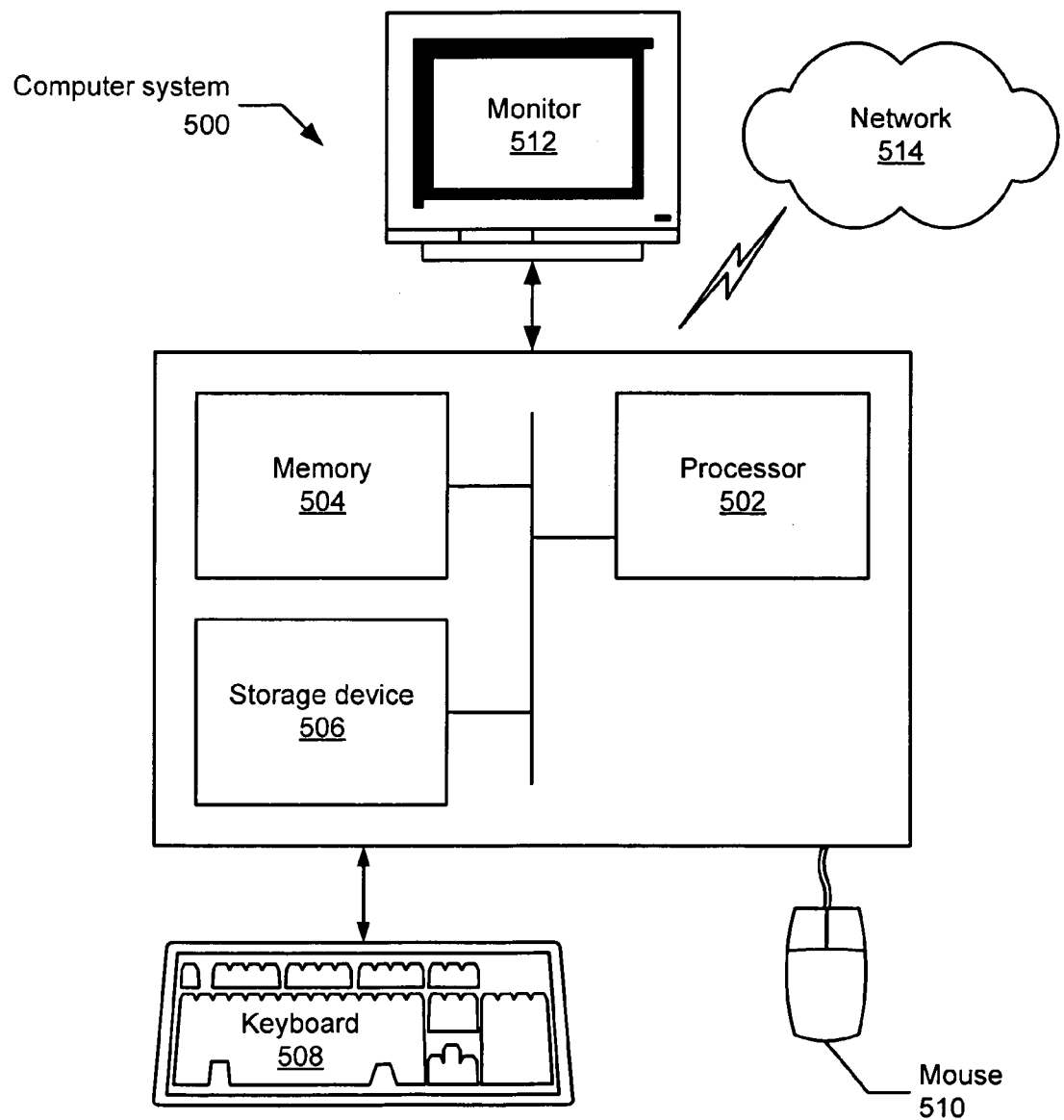
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention. For example, the computer system (500) may include a desktop personal computer, a laptop computer, a mobile device (such as a smart phone, a personal digital assistant, a mobile phone, etc.), a gaming device, a tablet computer, etc.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., client, networked tax preparation application, feed generator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating community-based tax deduction advice, comprising:
    obtaining, by a computer processor, a plurality of tax deduction suggestions from a community of taxpayers using a networked tax preparation application;
    determining a tax concern of a user of the networked tax preparation application;
    assigning a plurality of weights to the plurality of tax deduction suggestions based on frequencies of each of the plurality of tax deduction suggestions;
    filtering, based on the tax concern, the plurality of tax deduction suggestions to generate a subset of the plurality of tax deduction suggestions;
    generating a live feed word cloud of a text portion of the subset of the plurality of tax deduction suggestions, wherein the text portion is updated based on the tax concern of the user;
    displaying, by the computer processor and to the user in a graphical user interface (GUI) window of the networked tax preparation application, the live feed word cloud of the text portion of the subset comprising a plurality of font styles and a plurality of sizes, wherein the plurality of font styles and the plurality of sizes vary based on the plurality of weights; and
    receiving, using the networked tax preparation application and in the GUI window where the live feed word cloud corresponding to the tax concern is viewed by the user, an input from the user claiming a tax deduction.

2. The method of claim 1, wherein determining the concern comprises determining a current screen of the networked tax preparation application.

3. The method of claim 1, wherein determining the tax concern comprises evaluating tax-related input obtained from the user.

4. The method of claim 1, further comprising:
    displaying an advertisement for the networked tax preparation application, wherein the advertisement comprises the live feed word cloud.

5. The method of claim 1, further comprising:
    normalizing the plurality of tax deduction suggestions to reduce naming inconsistencies before displaying the live feed word cloud.

6. The method of claim 1, further comprising:
- generating a live feed scrolling list of the text portion of the subset of the plurality of tax deduction suggestions, wherein the text portion is updated based on the concern; and
- displaying, using the computer processor and for the user of the networked tax preparation application, the live feed scrolling list.

7. A system for generating community-based tax deduction advice, comprising:
- a computer processor;
- a networked tax preparation application executing on the computer processor and configured to:
  - obtain a plurality of tax deduction suggestions from a community of taxpayers; and
- a feed generator executing on the computer processor and configured to:
  - determine a tax concern of a user of the networked tax preparation application;
  - assign a plurality of weights to the plurality of tax deduction suggestions based on frequencies of each of the plurality of tax deduction suggestions;
  - filter, based on the tax concern of the user, the plurality of tax deduction suggestions to generate a subset of the plurality of tax deduction suggestions;
  - generate a live feed word cloud of a text portion of the subset of the plurality of tax deduction suggestions, wherein the text portion is updated based on the tax concern; and
  - display, to the user in a graphical user interface (GUI) window of the networked tax preparation application, the live feed word cloud of the text portion of the subset comprising a plurality of font styles and a plurality of sizes, wherein the plurality of font styles and the plurality of sizes vary based on the plurality of weights,
- wherein the network tax preparation application is further configured to receive, in the GUI window where the live feed word cloud corresponding to the tax concern is viewed by the user, an input from the user claiming a tax deduction.

8. The system of claim 7, wherein the feed generator is further configured to determine the tax concern by determining a current screen of the networked tax preparation application.

9. The system of claim 7, wherein the feed generator is further configured to determine the tax concern by evaluating tax-related input obtained from the user.

10. The system of claim 7, wherein the feed generator is further configured to:
- generate an advertisement for the networked tax preparation application, wherein the advertisement comprises the live feed word cloud.

11. The system of claim 7, wherein at least one selected from a group consisting of the networked tax preparation application and the feed generator is further configured to:
- normalize the plurality of tax deduction suggestions to reduce naming inconsistencies before displaying the live feed word cloud.

12. The system of claim 7, wherein the feed generator is further configured to:
- generate a live feed scrolling list of the text portion of the subset of the plurality of tax deduction suggestions, wherein the text portion is updated based on the tax concern; and
- display, for the user of the networked tax preparation application, the live feed scrolling list.

13. The system of claim 7, wherein the networked tax preparation application is further configured to:
- display a suggestion input control configured to obtain the plurality of tax deduction suggestions from the community of taxpayers.

14. The system of claim 13, wherein the suggestion input control comprises an auto-complete feature for reducing naming inconsistencies when obtaining the plurality of tax deduction suggestions.

15. The system of claim 13, wherein the networked tax preparation application is further configured to:
- display a feed customization control configured to obtain a user preference associated with the live feed word cloud, wherein the live feed word cloud is customized based on the user preference.

16. A non-transitory computer-readable storage medium storing instructions for generating community-based tax deduction advice, the instructions executable on a processor and comprising functionality to:
- obtain a plurality of tax deduction suggestions from a community of taxpayers using a networked tax preparation application;
- determine a tax concern of a user of the networked tax preparation application;
- assign a plurality of weights to the plurality of tax deduction suggestions based on frequencies of each of the plurality of tax deduction suggestions;
- filter, based on the tax concern of the user, the plurality of tax deduction suggestions to generate a subset of the plurality of tax deduction suggestions;
- generate a live feed word cloud of a text portion of the subset of the plurality of tax deduction suggestions, wherein the text portion is updated based on the tax concern of the user;
- display, to the user in a graphical user interface (GUI) window of the networked tax preparation application, the live feed word cloud of the text portion of the subset comprising a plurality of font styles and a plurality of sizes, wherein the plurality of font styles and the plurality of sizes vary based on the plurality of weights; and
- receive, using the networked tax preparation application and in the GUI window where the live feed word cloud corresponding to the tax concern is viewed by the user, an input from the user claiming a tax deduction.

* * * * *